Figure 1:
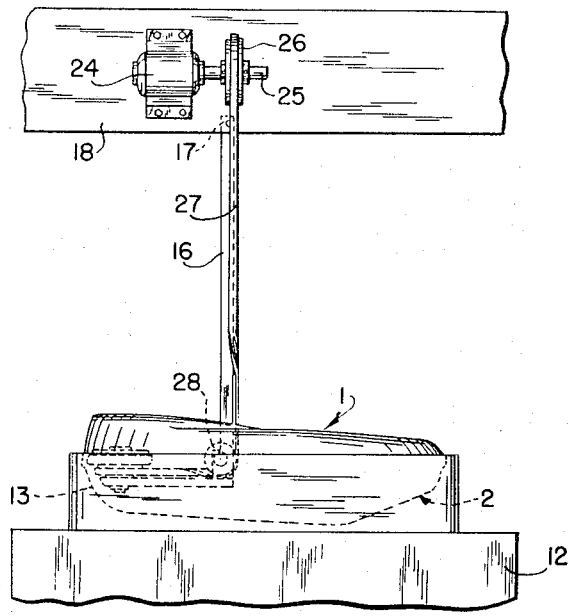

Dec. 19, 1967  H. A. BUKER ET AL  3,359,355
APPARATUS AND METHOD FOR MAKING PLASTIC ARTICLE
Filed Jan. 20, 1964

INVENTORS
HARVEY A. BUKER
BY LORENZO S. PRICE

ATTORNEYS

3,359,355
APPARATUS AND METHOD FOR MAKING PLASTIC ARTICLE

Harvey A. Buker and Lorenzo Sam Price, West Lafayette, Ohio, assignors to The Jones Metal Products Company, West Lafayette, Ohio, a corporation of Ohio
Original application Jan. 20, 1964, Ser. No. 338,975, now Patent No. 3,252,166, dated May 17, 1966. Divided and this application Jan. 7, 1966, Ser. No. 519,233
6 Claims. (Cl. 264—161)

This invention relates to the fabrication of plastic articles and more particularly to improvements in the apparatus and method for making plastic appliances, such as autoclavable bed pan appliances or the like. This application is a division of the copending application to Harvey A. Buker and Lorenzo S. Price, Ser. No. 338,975, now Patent No. 3,252,166 filed Jan. 20, 1964.

Plastic material and particularly thermoplastic, such as polypropylene, are highly suitable in the fabrication of molded articles requiring good strength characteristics when subjected to elevated temperature conditions. In providing a molded article, such as a sanitary bed pan appliance, by the process herein shown, it is essential to provide a construction which will withstand repeated sterilization, autoclaving and other such high temperature environmental conditions when used for instance, as domestic and/or hospital wares. Heretofore, difficulties have arisen in the production of such articles, particularly in the construction of bed pan appliances, wherein objectionable non-homogeneous seams and plastic deposition or flashing are produced on the component parts during fabrication. Such construction, especially in the area of the seam, not only reduces the shear and compression strength characteristics of the appliance, but substantially reduces the ability of the appliance to maintain dimensional stability and water-tightness when repeatedly subjected to elevated temperature conditions. Furthermore, flashings at the seam area results in the formation of objectionable sharp edges and abrasive surfaces which renders the appliance unsatisfactory for domestic and/or hospital usage. Such difficulties are due in part to the lack of understanding of the physical and chemical characteristics of plastic materials suitable for such purposes and of the proper methods for producing plastic articles, such as a bed pan appliance.

The apparatus and method of the present invention resides in the production of a composite, light-weight, seamless sanitary appliance, such as a bed pan, comprised of a thermoplastic material, such as polypropylene, having good shear and compression strength characteristics, high chemical resistance, and which has the ability to retain a useful strength level when subjected to repeated elevated temperature conditions.

Accordingly, an object of the present invention is to provide an efficient and economical method and apparatus for the production of a seamless, autoclavable plastic article, such as a bed pan appliance.

A further object of the present invention is to provide a novel method for the production of seamless, high strength, light-weight, water-tight, plastic bed pan appliance, including the molding of two halves of the bed pan appliance together under predetermined temperature and/or pressure conditions to form a unitary, composite article, and then removing the deposited plastic flashing from the interior and exterior surfaces of the article resulting from joining the halves together.

A still further object of the present invention is to provide an improved apparatus system for producing seamless, high strength, light-weight, water-tight bed pan appliance including a novel mechanism for removing deposited plastic flashing from the interior surfaces of the molded plastic article during production thereof.

Figure 2:
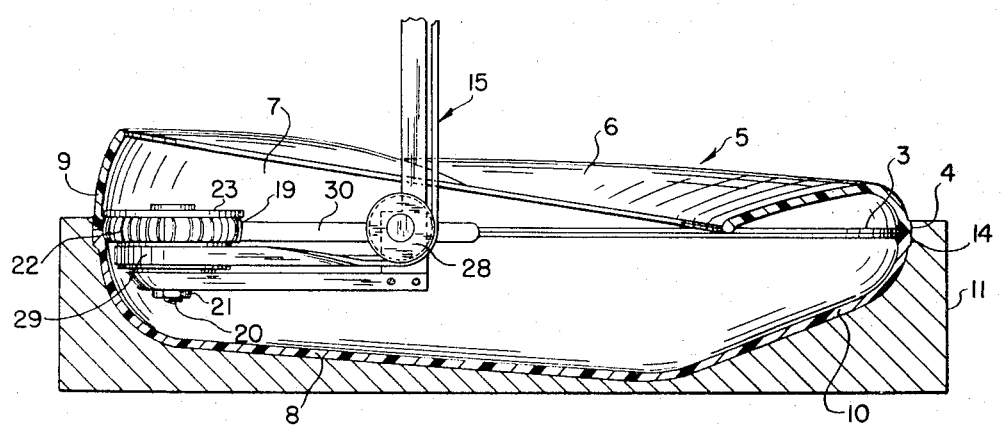

Other objects and advantages of the invention will be apparent from the following description taken in conjunction with the accompanying drawings wherein:

FIG. 1 is a fragmentary front elevational view, more or less diagrammatically illustrating the novel apparatus system for producing the plastic bed pan appliance of the present invention; and FIG. 2 is a fragmentary cross-sectional view on the slightly enlarged scale of a portion of the apparatus shown in FIG. 1, and more particularly showing the mechanism for removing deposited flashing material from the interior surface of the plastic bed pan appliance used in accordance with the present invention.

Referring now again to FIGS. 1 and 2, of the drawings, and according to a preferred form of the present invention, two halves, designated generally at 1 and 2, of the bed pan appliance are formed, such as by conventional injection or compression molding operations, from a thermoplastic material. It has been found that a thermoplastic material, such as polypropylene, is preferable since it incorporates a highly desirable strength-to-weight ratio, good chemical resistance with excellent dimensional stability and heat resistance characteristics at elevated temperatures.

The pre-shaped halves 1 and 2 of the appliance may then be transferred to a heat sealing device (not shown), which joins the mating halves together under the influence of suitable heat and/or pressure. In such case, the opposed mating surfaces of the appliance halves 1 and 2 are brought into contact with one another and heated to bring the plastic material to its fusion temperature, which in the heat-sealing of polypropylene is preferably at a temperature of about 275° F. The temperature of fusion is retained for a time sufficient to cause heat-softening of the plastic surfaces after which they are quickly joined together and held firmly in position until the softened material has cooled to form a strong endless joint in a horizontal plane extending between the appliance halves.

To secure adequate adhesion between the mating plastic surfaces during such heat-sealing, the plastic material is exuded generally radially relative to the parting line between the appliance halves 1, 2 and in opposite directions therefrom both interiorly and exteriorly of the appliance. The exuded plastic material, thus deposited, gradually cools and forms objectional endless ribs or flashings 3 and 4 (FIG. 2) which must be removed therefrom without impairment to the properties of the material beneath the weld, as will hereinafter be more fully described.

The composite bed pan appliance 5, thus produced, may be of a conventional generally oblate, in plan, configuration having a contoured, generally concavo-convex marginal seat defining flange 6 extending around the top of the appliance. The marginal flange 6 defines the usual generally longitudinally extending opening 7 for receiving materials therethrough.

As shown in cross-section at FIG. 2, the bottom of the appliance includes a generally flat or planar central portion 8 which curves upwardly at one end 9 and which tapers angularly upwardly at the other end 10 to curvingly merge with the aforementioned flange 6.

The plastic bed pan appliance, thus heat-sealed, may then be positioned in a support member 11. The support member 11 is loosely supported upon a stationary support table or base 12. The member 11 is provided with a centrally disposed cavity 13 conforming in contour to that of the bottom half 2 of the bed pan appliance. The dimensional characteristics of the cavity 13 are so determined that the appliance can readily be inserted and removed therefrom while providing maximum support therein for the body of the appliance.

The support member 11 is further provided with an interior recessed channel 14 which extends around the interior peripheral surface adjacent the top of the support member, and which extends downwardly therefrom a sufficient distance to receive therein the aforementioned exuded plastic flashing 4 deposited on the exterior surface of the appliance. Moreover, the recessed channel 4 is dimensionally predetermined to accommodate the width and thickness of the aforementioned exterior plastic flashing 4 and coacts therewith to oppose the resultant forces from the subsequent interior finishing operation.

The composite bed pan appliance 5 and associated support member 11, as shown in FIGS. 1 and 2 are positioned, ready for interior finishing by means of a stationary cutting mechanism designated generally at 15. As shown, such mechanism includes a generally L-shaped, in elevation, support bracket 16 secured at one end 17 to the frame structure 18 of a conventional molding press (not shown) or other such similar type of associated apparatus. The other end of the L-shaped bracket 16 is disposed to mount a generally annular cutting wheel 19.

The cutting wheel 19 is mounted for rotation about its vertical central axis on one end of a stub shaft 20, which shaft is secured to the L-shaped bracket by a suitable friction fastener, such as a lock-nut 21. The cutting wheel 19 is preferably provided with a plurality of radially extending, circumferentially spaced cutting teeth 22, each having a generally arcuate, in side elevation, configuration. Such arcuate configuration of the cutting teeth 22 affords a sufficient clearance angle in relation to the plastic work-piece to minimize heat build-up in the material and effectively obviates scarification of the material surface.

To guide and steady the cutting wheel 19 during working movement thereof, an annular guide disc 23 may be mounted on the stub shaft 19 in concentrically superimposed relation on the cutting wheel 19. The annular guide disc 23 is preferably of the same relative diameter as that of the cutting wheel 19 so as to be substantially co-extensive with the marginal circumferentially cutting surface defined by the radially extending teeth 22. By such superimposed arrangement, the annular guide disc 23 is brought, in operation of the cutting wheel 19, to overlie the exuded plastic flashing 3 deposited and engageably coacts with the confronting interior surface of the appliance to maintain the cutting wheel 19 in a predetermined working engagement with the plastic material to be removed. Hence, the disc automatically controls the depth of penetration of the cutting teeth 22 and the amount of material removed from the work piece per revolution of the wheel.

Rotational movement of the cutting wheel 19 about its generally vertical axis is preferably accomplished by means of a pulley and powered drive belt arrangement. As shown, power is supplied from a conventional type variable speed electric motor 24 mounted on the frame structure 18. The motor 24 is provided with an output shaft 25 which rotatably mounts a drive pulley 26. A belt 27 extends around the pulley 26 and is twisted around an idler pulley 28 which is mounted for free rotation upon the L-shaped bracket 16. The other end of the drive belt 27, in turn, is trained around a driven pulley 29 which is secured to the stub shaft 20.

In a typical application of finishing the bed pan appliance, thus formed, to provide a seamless, composite unitary structure, the support member 11 is preferably oriented, such as by manual manipulation, on the base 12 so that the cutting wheel 19 of the cutting mechanism 15 is disposed through the opening 7 and interiorly of the appliance. Power may then be supplied to the cutting mechanism 15, via motor 24, for rotating the cutting wheel 19 in a horizontal plane about its vertical central axis. To commence the interior finishing operation, the appliance may then be oriented so that the cutting wheel 19 is brought into working engagement with the deposited plastic rib or flashing 3. With such orientation of the cutting wheel 19, the annular guide disc 23 is brought to overlie the interior flashing 3 and into abutting engagement against the confronting interior surface of the appliance. Such confronting disposition of the guide disc 23 limits the extent of penetration of the cutting wheel 19 to provide a smooth, homogeneous bond between the mating halves 1 and 2 of the appliance upon actuation of the wheel.

To complete the interior finishing operation, the appliance is then progressively turned, as a whole, and in friction engagement against the now rotating cutting wheel 19 until a smooth, uninterrupted, seamless bond is formed between the mating halves of the appliance. A portion of the bond, thus formed, is shown at 30 of FIG. 2. It is preferred that the appliance be maintained in constant motion so that excess heat is not generated in one area to burn or soften the surface. By such method, a homogeneous, seamless bond is formed between the mating halves of the plastic appliance with a weld strength of the bond approximating that of the parent material. Upon completion of the interior finishing operation, the appliance may then be removed from the support member 11 and transferred to a suitable location for removal of the exterior flashing 4 and for any other further finishing operation, as is known in the art.

While in the illustrative embodiment described, the method and apparatus herein are used in making plastic bed pan appliances, it is to be understood that the invention is not limited to the exact detail shown and described, but may be employed in all essential details in making various kinds of articles wherein it is essential to provide a seamless, autoclavable plastic structure which is susceptible for use after repeated exposure to elevated temperatures.

The terms and expressions which have been used are used as terms of description, and not of limitation, and there is no intention in the use of such terms and expressions of excluding any equivalents of any of the features shown or described, or portions thereof, and it is recognized that various modifications are possible within the scope of the invention claimed.

We claim:

1. A method of making a seamless, autoclavable article from a plastic material, which comprises providing a pair of shaped article halves, joining the shaped halves together to form a composite, unitary article having an exuded rib of plastic material deposited adjacent the joined marginal edges thereof, and then progressively removing the deposited plastic material from the interior of said article by providing a support member contoured to accommodate one-half of said article and having an internal recessed portion therein of a size sufficient to receive the exuded rib of plastic material deposited on the exterior surface of said article, positioning said article in said support member so that the exterior exuded rib of plastic material is supportingly disposed in said recessed portion, bringing a cutting means into material removing engagement against the exuded rib of plastic material deposited on the interior of said article, turning the support member while maintaining said cutting means in a substantially fixed position, and then progressively removing the exuded rib of plastic material from the interior surface of said article by cutting while simultaneously controlling the depth of penetration of said cutting means, moving said article from said support member and removing the plastic material from the exterior surface of said article to provide a smooth, seamless structure for permanently holding the joined article halves in assembled position.

2. A method in accordance with claim 1, including the steps of joining the article halves together along their opposed marginal edges under the influence of heat and pressure.

3. A method in accordance with claim 1, wherein said plastic material is polypropylene.

4. A method of making a seamless, autoclavable hollow article from a plastic material the steps comprising, providing a pair of article sections having mating marginal edges, joining said edges together in abutting relationship, heat-sealing said edges together to provide a composite, unitary article having an exuded interior and exterior rib of plastic material adjacent the joined edges thereof, positioning said article in a support member formed to accommodate at least one of said sections, said support member having an internal recessed portion dimensioned to supportingly receive the exuded exterior rib of plastic material, bringing a cutting means into material removing engagement against the exuded exterior rib, and then progressively removing the exuded rib of plastic material from the interior surface of said article by cutting, moving said article from said support member and removing the plastic material from the exterior surface of said article to provide a smooth, seamless structure for permanently holding the joined article sections in assembled position.

5. A method in accordance with claim 4, including the step of simultaneously controlling the depth of penetration of said cutting means during the progressive removal of said exuded interior rib of plastic material.

6. A method in accordance with claim 4, wherein said heat-sealing comprises the application of heat and pressure to said edges.

References Cited

UNITED STATES PATENTS

| | | | |
|---|---|---|---|
| 1,006,574 | 10/1911 | Lorenz | 82—101 |
| 1,779,467 | 10/1930 | Einstein | 51—291 X |
| 2,299,650 | 10/1942 | Parks et al. | 83—674 |
| 3,100,172 | 9/1963 | Nier | 264—248 |
| 3,206,201 | 9/1965 | Hendricks | 264—248 |

ROBERT F. WHITE, *Primary Examiner.*

S. I. LANDSMAN, C. AUVILLE, *Assistant Examiners.*